INVENTOR
CASIMIR ANDRÉ LOUBIERE
BY Otto Munk
HIS ATT'Y

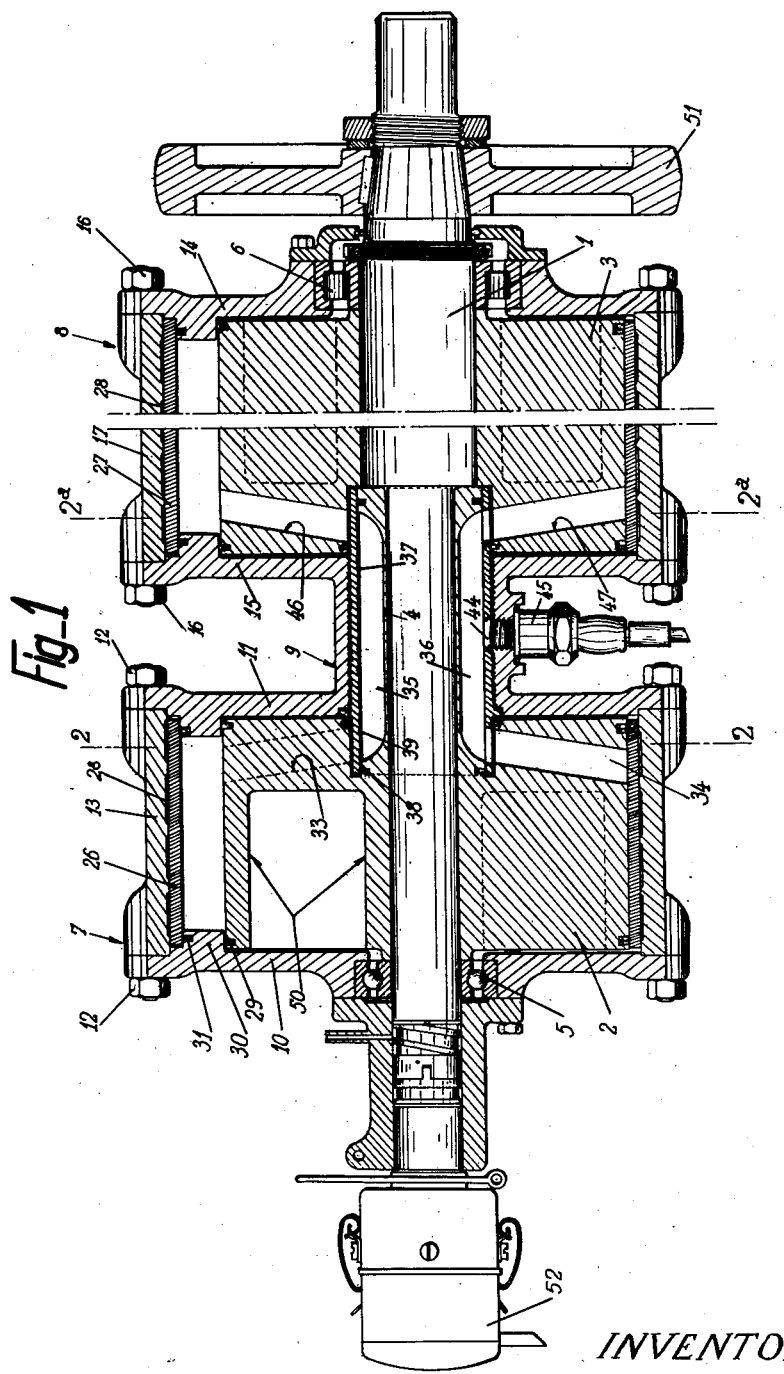

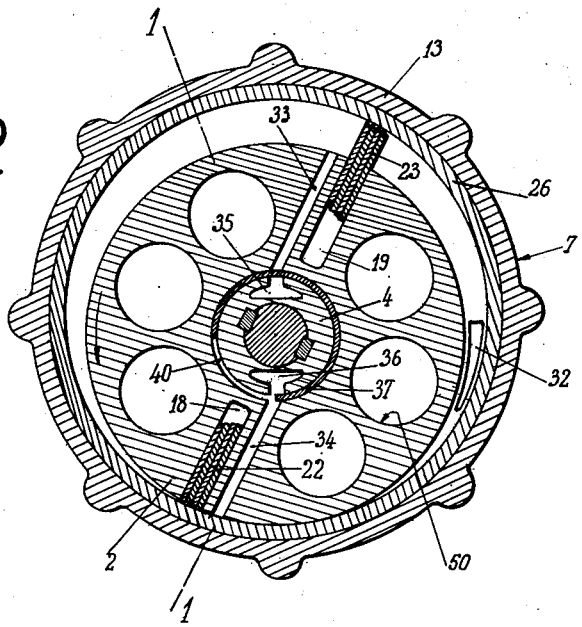
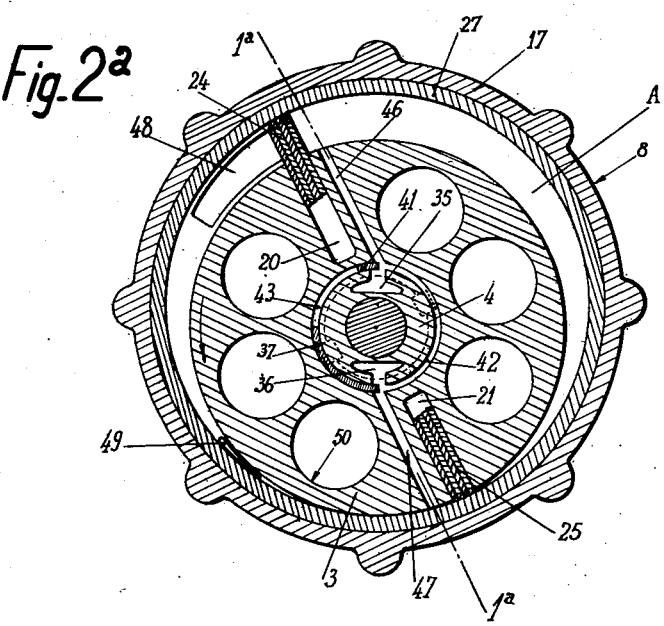

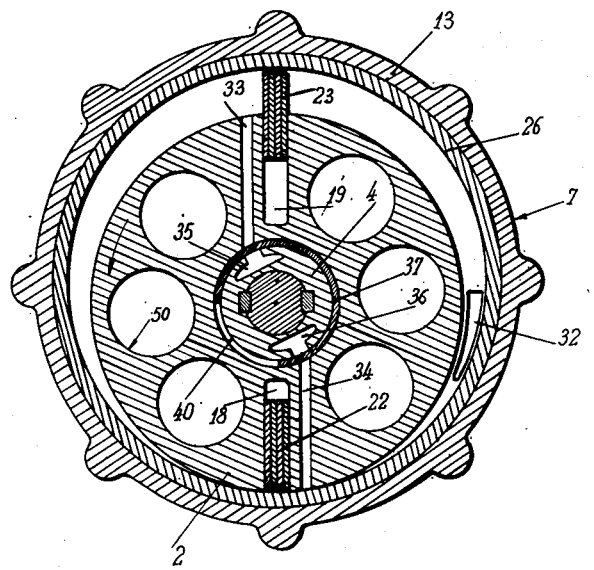
Fig. 3
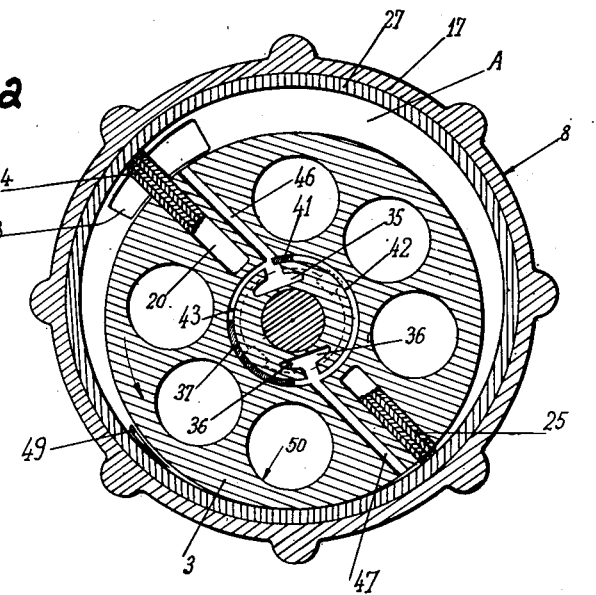
Fig. 3ᵃ
INVENTOR
CASIMIR ANDRÉ LOUBIERE
BY Otto Munk
HIS ATTY June 13, 1950 C. A. LOUBIERE 2,511,441
ROTARY INTERNAL-COMBUSTION ENGINE
Filed July 16, 1947 5 Sheets-Sheet 4

June 13, 1950          C. A. LOUBIERE          2,511,441
ROTARY INTERNAL-COMBUSTION ENGINE
Filed July 16, 1947          5 Sheets-Sheet 5
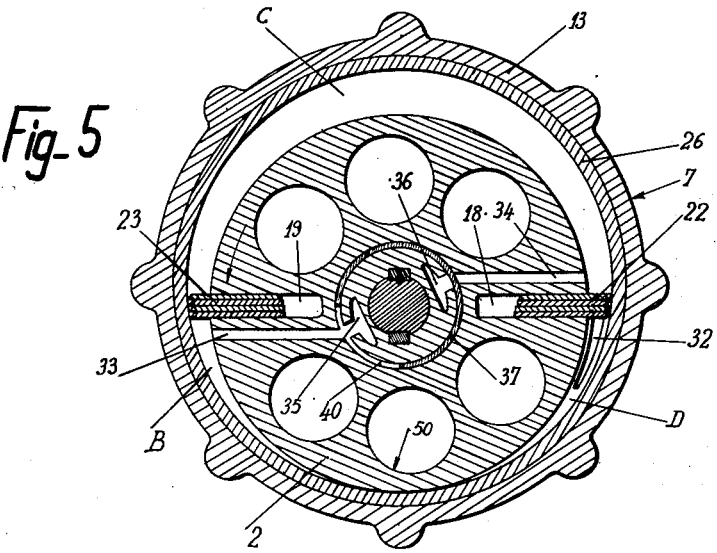
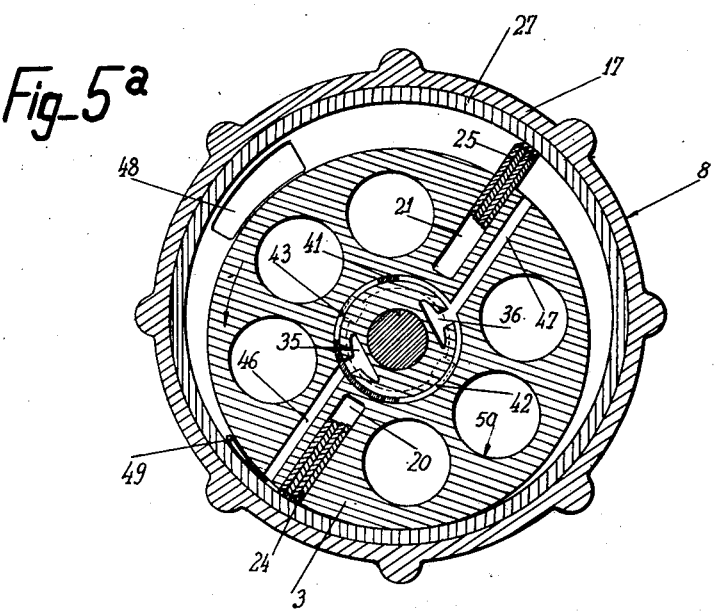
INVENTOR
CASIMIR ANDRÉ LOUBIERE
BY Otto Munk
HIS ATTY Patented June 13, 1950

2,511,441

UNITED STATES PATENT OFFICE 2,511,441

ROTARY INTERNAL-COMBUSTION ENGINE

Casimir André Loubiere, Paris, France, assignor to Compagnie Normande d'Etudes pour l'Application de Procedes Mecaniques, Bourth (Eure), France, a French Company Application July 16, 1947, Serial No. 761,375
In France January 11, 1946

Section 1, Public Law 690, August 8, 1946
Patent expires January 11, 1966

8 Claims. (Cl. 60—44)

The present invention has for its object to devise a rotary internal combustion engine of simple, sturdy and cheap construction, affording a great power per unit of weight and per unit of volume of the space occupied, an efficiency greater than that of existing engines as well as various other advantages which are hereinafter disclosed.

The improved engine comprises a central rotor or core and, on either side thereof and keyed to the same shaft, a compressor rotor with radial vanes and an expansion rotor with radial vanes, each of said rotors being eccentrically mounted for rotation in a stationary stator, while the central rotor is provided with explosion chambers and is adapted to rotate relatively to a stationary distributing sleeve, so that, at each revolution of the rotors, one of the chambers is filled with combustible mixture compressed by the compressor, said compressed mixture is ignited and the burnt gases flow into the expanding device where they expand and from which they are exhausted.

Further features of the invention will be apparent from the following description, with reference to the appended drawing, which shows, by way of example, an embodiment of the invention and in which:

Fig. 1 is a central section of the engine along line 1—1 of Fig. 2 and 1a—1a of Fig. 2a;

Fig. 2 is a transverse section of the compressor along line 2—2 of Fig. 1;

Fig. 2a is a transverse section of the expansion device along line 2a—2a of Fig. 1;

Figs. 3, 3a, 4, 4a, 5 and 5a are similar sections of Figs. 2 and 2a respectively, showing various positions of the rotor.

Figure 4:
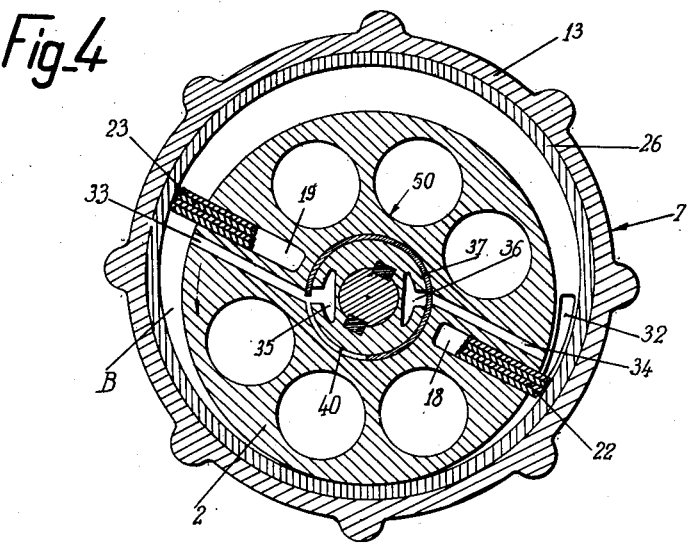

Referring to the drawing, 1 denotes the engine shaft, on which are mounted a compressor rotor 2 provided with radial vanes, an expansion rotor 3 of the same type, and an intermediate rotor or core 4. Said rotors may be made of a single piece, as shown in the drawing.

Shaft 1 is mounted by means of roller or other antifriction bearings 5 and 6 in a casing comprising two stationary stators 7 and 8 for rotors 2 and 3 and an intermediate stator 9 surrounding the intermediate rotor 4. In the example shown, stator 7 comprises an external flange 10 and an internal flange 11, secured by studs 12 on a ring 13; stator 8 similarly comprises an external flange 14 and an internal flange 15 both secured by studs on a ring 17; stator 9 is integral with flanges 11 and 15.

The internal cavity of stators 7 and 8 is of cylindrical shape and in eccentric relation with the periphery of rotors 2 and 3, which are tangent to the internal wall of said stators (Figs. 2 and 2a). The rotors are provided with radial slots 18, 19, 20, 21 in which are slidable vanes 22, 23, 24, 25 adapted to move away from the axis during the rotation, under the effect of centrifugal force, the outer ends of said vanes engaging sleeves 26, 27 adapted to freely rotate in ball or antifriction bearings such as 28.

The crescent-shaped spaces comprised between the rotors and the stators, the vanes and the flanges are of periodically changing capacity, as it is well known in this kind of compressors.

Lateral fluid-tightness is obtained by radially acting packing rings such as 29, arranged between the rotors and crescent shaped bosses 30 of the flanges, and radially acting packing rings 31, between said bosses and sleeves 26, 27.

In the flange 10 or in both flanges 10 and 11 is provided an intake opening 32 (Fig. 2) located adjacent to the end of the crescent shaped space in the compressor, while rotor 2 is bored adjacent to flange 11 with outlet ducts 33, 34 arranged ahead of the vanes 22, 23 for the direction of rotation of the engine indicated by the arrow.

Rotor 4 is provided with longitudinal and symmetrical cavities 35, 36 forming the explosion chambers; distribution is assured by a stationary sleeve 37 rigidly mounted within stator 9, while radially acting packing rings 38, 39 are arranged between said sleeve and the rotors. On the compressor side, said sleeve is formed with an intake opening 40 extending over 90° (Fig. 2) and, on the expansion side, said sleeve is formed with expansion and exhaust opening extending over about 270°. Said second opening is interrupted by a small bridge 41 (Fig. 2a) which occupies an angular space of about 20° and divides the expansion and exhaust opening into two ports 42, 43, the first of which serves to the expansion and the other to the exhaust. The object of said disposition will appear later on. Finally, when the engine is of the four-cycle internal combustion type, the sleeve is formed with a middle opening 44, giving access to a sparking plug 45.

The burnt gases produced in the explosion chambers 35, 36 are led to the crescent-shaped spaces of the expansion rotor through the openings 42, 43 and intake ducts 46, 47 of said rotor, said ducts being located rearwardly of vanes 24, 25 for the direction of rotation shown in the drawing. In flange 14 or in both flanges 14 and 15 are provided two exhaust openings 48, 49 (Fig. 2a) of suitable angular position.

The weight of rotors 2 and 3 may be reduced by providing holes such as 50.

Shaft 1 is provided with a power-transmission device, such as a pulley 51 and an ignition device such as 52, adapted to produce sparks at the sparking plug 45.

The vanes 24, 25 of the expansion rotor should be stronger than the vanes 22, 23 of the compressor, in order to withstand the expansion power. The internal volume of the expansion rotor should be larger than that of the compressor in order to provide for the full expansion of the gases. This is simply obtained by correspondingly increasing the axial length of the expansion cylinder.

The engine operates as follows:

1. *Ignition (Figs. 2–2a)*

With the rotors in the position shown in Figs. 2–2a, the explosion chamber 36 is filled with the combustible mixture, formerly compressed during the compression cycle (see below) and duct 34 (Fig. 2) is about to be closed by the solid portion of sleeve 37 on the compressor side, while the expansion duct 47 (Fig. 2a) is uncovered by the opening 42 in said sleeve, on the expansion side. Ignition should theoretically take place at this time if no ignition advance was provided. In fact, ignition must be produced a long time before the moment corresponding to the position shown in Figs. 2–2a, but, in order to facilitate the understanding of the invention, it has been assumed in the drawing that there is no ignition advance.

In practice, on account of the high rotation speed of this engine an important ignition advance must be provided; such advance may be varied according to the compression rate. With a testing engine rotating at a relatively low speed (3,000 R. P. M.) and working at a compression rate of 5, it has been found that an advance of 40° gives good results. Such advance may be made variable by any conventional means.

At the time of ignition, chamber 35 is at the end of the expansion cycle and just about to be connected with the exhaust (this happens as soon as vane 24 reaches the edge of exhaust opening 48).

2. *Expansion (Figs. 2a to 3a)*

The gases produced by the explosion are led to the rear side of vane 25 through duct 47 and the thrust upon said vane keeps the engine rotating in the direction of the arrow.

The explosion gases have a tendency to escape through the space corresponding to the area of opening 42 and comprised between the central rotor and the expansion rotor, and, through duct 46, towards the expansion chamber A (Fig. 2a). Without bridge 41, the burnt gases would follow said path directly to the exhaust. However, from the very beginning of the exhaust cycle, duct 46 is closed by bridge 41, which prevents by-passing of the burnt gases to the exhaust.

Expansion keeps on going through 180°, up to the moment when chamber 36 reaches the position originally occupied by chamber 35, as shown in Fig. 2a, and when vane 25 comes to occupy the position which was originally occupied by vane 24, as shown on the same figure. The successive positions are shown on Figs. 2a, 3a, 4a and 5a.

3. *Exhaust*

As shown on Fig. 2a, chamber 35 and chamber A were about to be connected to the exhaust. Figs. 2a and 3a show that chamber 35 is isolated during the 20° rotation corresponding to the angular length of bridge 41, while chamber A is already connected to the exhaust. Chamber 35 is then connected in turn to the exhaust, as duct 46 is uncovered by bridge 41 (Fig. 3a) and the vacuum produced by the exhaust at high speed actually causes a suction in chamber 35.

The exhaust cycle keeps on going through the 70° angle of opening 43.

4. *Compression*

Figure 4A:
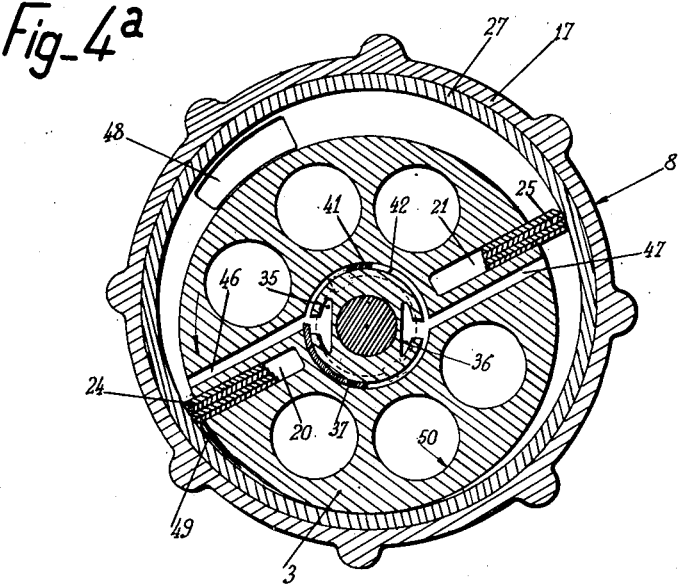

At the end of the exhaust cycle, duct 46 is covered by the solid portion of sleeve 37 (Fig. 4a). At the same time (Fig. 4) duct 35 is uncovered by opening 40 of sleeve 37. The mixture compressed in chamber B of the compressor enters chamber 35 and the intake keeps on going during the 90° corresponding to the opening angle of port 40. An intermediate position is shown in Fig. 5. The end of the intake cycle corresponds to the position shown in Fig. 2a, in which chamber 35 has rotated by 180° and has taken the place of chamber 36.

It appears from the foregoing that, during each revolution of the engine shaft, each chamber 35, 36 goes through a complete cycle; ignition, expansion (180°), exhaust (90°) filling up (90°), with two power impulses per revolution of the engine.

The compressor cycle appears from Figs. 2 to 5. On Fig. 5, vane 22 is about to pass over the intake opening 32. Chamber D is in the intake cycle, chamber C is at the beginning of the compression cycle and chamber B is at the end of the compression cycle and at the beginning of the intake cycle of chamber 35.

It will be noticed that there are two exhaust openings 48, 49, the first one being disposed in such a manner as to adjust the exhaust timing, while the second one enables the complete exhaust of the burnt gases contained ahead of vane 24 (Fig. 4a).

Connection between the compressor and the expansion rotor through chambers 35, 36 is constantly interrupted except:

(1) As the case may be, during a short instant at the beginning of the exhaust cycle (Fig. 2a). On account of the inertia of the moving gases and of the brevity of such instant, no back flow to the compressor is liable to take place;

(2) During a short instant at the moment corresponding to the end of the exhaust cycle and to the beginning of the intake cycle (Fig. 4a). Such instant may be used to advantage, if necessary, to provide a slight scavenging of burnt gases by a very small quantity of fresh gases.

This engine may be easily constructed to operate on the true Diesel or the semi-Diesel cycle, by replacing the sparking plug by an injector and the ignition device by a pump.

Lubrication may be provided, either by adding oil to the intake gases, or by forcing oil through the central shaft and lubricating grooves or distributing ducts leading to the surfaces in relative motion.

The engine may be started by hand, by an electric starter or by compressed air.

This engine, which avoids the drawbacks of the conventional internal combustion engine with reciprocating pistons and those of the explosion turbine, affords important advantages. A testing engine rotating at low speed (3,500 to 4,000 R. P. M.) taking 750×2=1,500 cc. of combustible mixture, compressed to a compression rate of 5, delivers a power of 80 to 100 H. P., its weight being 110 lb. and its outside diameter 10" and length 20".

Due to the location of the explosion chambers between the two metallic masses constituted by the rotors in rapid motion and to the shape of the stators, the evacuation of heat is facilitated and artificial cooling is generally superfluous, inasmuch as the expansion, extended as it is over 180°, considerably lowers the temperature at the exhaust side and the average working temperature of the expansion rotor. These advantages greatly improve the efficiency.

The rotation speed is limited by the speed of expansion of the gases, the necessary power for compressing the combustible mixture and the friction losses (the latter being reduced to a low value since the rotating parts are mounted on balls, rollers or needles) and it may reach very high values; it is however limited by the mechanical resistance of the metal employed (20,000 R. P. M., for example, may be attained). This greatly assists in further increasing the power per unit of weight of the engine.

As the vanes are caused to bear on rotary sleeves 26, 27 the amount and speed of the relative motion of rotation of the vanes relatively to the sleeves are greatly reduced and friction and wear are therefore very low.

Every reciprocating motion, with the exception of the relatively very slow motion of the vanes, is eliminated. The working cycle comprises no dead point, which eliminates the necessity of a fly-wheel of large mass and at the same time offers a great flexibility, instantaneous variations of speed and a very smooth and stable idling.

Filling of the explosion chambers at high speed is satisfactory, inasmuch as the compressor intake takes place in a continuous and even constant manner, whereas the gaseous flow is periodically stopped by the closing of the valves of the conventional engines. The exhaust is also performed in a continuous and almost constant manner. The pulsatory working condition of usual engines is therefore replaced by continuous flow working condition, which is favorable to the efficiency and to the elimination of vibrations and noise.

The cost of the apparatus is only a small fraction of a usual engine, even of a two-cycle engine, owing to the eliminations of the distribution system and to the substitution of a straight shaft for the conventional crank shaft and of two cylindrical rotors for the pistons and their connecting rods. It follows that the problem of balancing the moving masses is greatly simplified.

Obviously, the invention is not limited to the details of construction above described, which have only been given by way of example.

Having now described my invention what I claim as new and desire to secure by Letters Patent is:

1. In an internal combustion engine, a rotatable power shaft, a cylindrical compressor rotor and a cylindrical expansion rotor each keyed to an end portion of said shaft, both rotors embodying at their periphery radially slidable vanes, eccentric cylindrical stationary casings for said rotors, a fixed distributing sleeve arranged concentrically around said shaft between said casings, an intermediate core keyed to said shaft between said rotors and rotatable in said sleeve, said core having two diametrically opposed grooved combustion chambers, ignition means extending through the wall of said sleeve, means for feeding a combustible mixture to said compressor rotor, exhaust ports in the casing of said expansion rotor, and ducts and ports in said rotors and said sleeve affording through said grooved combustion chambers intermittent communication between said chambers and the spaces limited by each said rotor and its respective casing, said last named ducts and ports being constructed and arranged to control the timing of the intake of said combustible mixture, its compression by said compressor rotor, ignition of said compressed mixture in said combustion chambers, and expansion and exhaust of the burnt mixture in and through said expansion rotor; said last named ducts and ports comprising two radial ducts in said expansion rotor opening into said rotor rearwardly of diametrically opposed vanes thereof, an expansion port of about 180° angular length in said sleeve for the passage and expansion of the burnt mixture into said expansion rotor, an exhaust port of about 70° angular length in said sleeve separated from said expansion port by a bridge of about 20° angular length adapted to cut off communication between the combustion chamber which is on the beginning of the expansion stroke and the combustion chamber which, at the same instant, is communicating with the exhaust.

2. In an internal combustion engine, a rotatable power shaft, a cylindrical compressor rotor and a cylindrical expansion rotor both keyed to said shaft, both rotors embodying radially slidable vanes, eccentric stationary cylindrical casings for said rotors, a rotary lining in each casing, engaging the outer edges of the said corresponding vanes, antifriction rolling means between each said lining and its corresponding casing, a fixed distributing sleeve axially arranged between said casings, an intermediate core keyed to said shaft between said rotors and rotatable in said sleeve, said core having two diametrically opposed cavities, forming combustion chambers, ignition means attached to said sleeve for intermittently igniting the fuel mixture contained in said cavities, means for feeding a combustible mixture to said compressor rotor, exhaust ports in the casing of said expansion rotor, and ducts and ports in said rotors and said sleeve affording intermittent communication between said combustion chambers and the spaces limited by said rotors and casings, said ducts and ports being constructed and arranged for timing the intake of combustible mixture compressed by said compressor rotor, ignition of said mixture in said combustion chambers and expansion and exhaust of the gases into and through said expansion rotor.

3. In a rotary internal combustion engine, a rotatable power shaft, a cylindrical compressor rotor and a cylindrical expansion rotor spaced apart from each other and respectively keyed to the end portions of said shaft for rotation with said shaft, a cylindrical stationary casing for each of said rotors, said casings being eccentric to said rotors, each casing having an outer flange forming a tight joint with said shaft, and an inner flange having a circular opening concentric with said shaft, said opening having a diameter greater than the diameter of said shaft, a rotary lining in each casing disposed and arranged for rotation against the inner cylindrical face of each said casing, the inner cylindrical face of each said lining being substantially tangent to the outer cylindrical face of said rotors along a generatrix of each said rotor, radial vanes having one of their ends movably engaging each said rotor, and their other ends engaging the inner face of the respective rotary linings, an intermediate stationary casing concentric with, and disposed around the intermediate portion of said shaft and connecting at each end with the inner flange of said casings and having an internal diameter substantially the same as that of said circular opening in said inner flanges, the face of each said rotor adjacent the inner flange of said eccentric casings having an annular recess around said shaft, each said recess having a diameter substantially equal to the internal diameter of said intermediate casing, a distributing sleeve closely fitting around said shaft and fixedly mounted on said intermediate casing between the inner cylindrical face thereof and the outer surface of said shaft, the end portions of said sleeve extending within said annular recesses in the rotors, said intermediate portion of said shaft having two diametrically opposed combustion grooves extending lengthwise of said shaft, and having their end portions extending within said annular recesses in the rotors, ignition means attached to said sleeve for intermittently igniting the fuel mixture contained in said combustion grooves, means for feeding a combustible mixture to said compressor rotor, means to exhaust the burnt fuel from said expansion rotor, diametrically opposed radial ducts in said rotors, each of said ducts having an opening into said annular recesses opposite an end portion of said combustion grooves, slots in each end portion of said distributing sleeve, said ducts in said rotors, said combustion grooves and said slots being constructed and arranged to afford intermittent communication from the space between said compressor rotor and its casing to the space between said expansion rotor and its casing through said ducts, said slots, and said grooves for timing the intake and compression of a combustible mixture by said compression rotor, the ignition of said mixture in said grooves and the expansion and exhaust of the combustion mixture in and through said expansion rotor.

4. An internal combustion engine as claimed in claim 3 in which said slots are disposed along a circle of said sleeve and in two planes passing respectively through the openings of the ducts of each rotor into said annular recesses.

5. An internal combustion engine as claimed in claim 4 in which said ducts include two radial ducts in each rotor, and said slots include an intake slot of at least 90° angular length on the compressor rotor side, and on the expansion rotor side an expansion slot of about 180° angular length and an exhaust slot of about 70° angular length, said expansion and exhaust slots being separated by a bridge of about 20° angular length, said intake slot being disposed on the angular length of the sleeve which on the expansion rotor side corresponds substantially to the bridge between the end of the exhaust slot and the beginning of the expansion slot.

6. In an internal combustion engine, a rotary power shaft, a cylindrical compressor rotor and a cylindrical expansion rotor each keyed to an end portion of said shaft, each rotor embodying at its periphery radially slidable vanes, stationary cylindrical casings for said rotors and disposed eccentrically thereto, a fixed distributing sleeve disposed concentrically around said shaft between said casings, diametrically opposed longitudinal grooves in the periphery of said shaft, said grooves forming combustion chambers, fuel ignition means extending through the wall of said sleeve, means for feeding a combustible mixture to said compressor rotor, exhaust ports in the casing of said expansion rotor, and ducts and ports in said rotors and said sleeve affording through said grooves intermittent communication between said grooves and the crescent-shaped space defined between each rotor and its surrounding casing, said ducts and ports controlling the timing of intake of the combustible mixture, its compression in said compressor rotor, its ignition in said grooves and the exhaust of the burned gases into and through said expansion rotor.

7. In an internal combustion engine, a rotatable power shaft, a cylindrical compressor rotor and a cylindrical expansion rotor both keyed to said shaft, both rotors embodying radially slidable vanes, eccentric stationary cylindrical casings for said rotors, anti-friction rotary means between each of said slidable vanes and the inner face of each said casing, a fixed distributing sleeve axially arranged between said casings, an intermediate core keyed to said shaft between said rotors and rotatable in said sleeve, said core having two diametrically opposed cavities, forming combustion chambers, ignition means attached to said sleeve for intermittently igniting the fuel mixture contained in said cavities, means for feeding a combustible mixture to said compressor rotor, exhaust ports in the casing of said expansion rotor, and ducts and ports in said rotors and said sleeve affording intermittent communication between said combustion chambers and the spaces limited by said rotors and casings, said ducts and ports being constructed and arranged for timing the intake of combustible mixture compressed by said compressor rotor, ignition of said mixture in said combustion chambers and expansion and exhaust of the gases into and through said expansion rotor.

8. An internal combustion engine as claimed in claim 1, in which said last named ducts and ports further comprise two radial ducts in said compressor rotor opening on said rotor ahead of diametrically opposed vanes thereof, and an intake port of at least 90° angular length in said sleeve for the intake of the compressed mixture into said combustion chambers.

CASIMIR ANDRÉ LOUBIERE.

REFERENCES CITED

The following references are of record in the file of this patent:

UNITED STATES PATENTS

| Number | Name | Date |
|---|---|---|
| Re. 12,183 | Guindon | Dec. 8, 1903 |
| 51,165 | Fletcher | Nov. 28, 1865 |
| 860,656 | Gregory | July 23, 1907 |
| 880,009 | Burton | Feb. 25, 1908 |
| 969,957 | Jacobs | Sept. 13, 1910 |
| 976,913 | Putman | Nov. 29, 1910 |
| 1,192,665 | Mears | July 25, 1916 |
| 1,899,374 | Werle | Feb. 28, 1933 |
| 2,390,169 | Pogioli | Dec. 4, 1945 |

FOREIGN PATENTS

| Number | Country | Date |
|---|---|---|
| 515,446 | France | Nov. 26, 1920 |